United States Patent

Williams

Patent Number: 5,815,214
Date of Patent: Sep. 29, 1998

[54] OSCILLATORY SIGNAL GENERATOR ARRANGEMENT

[75] Inventor: Gareth Robert Williams, Wiltshire, United Kingdom

[73] Assignee: Plessey Semiconductors Limited, United Kingdom

[21] Appl. No.: 566,976

[22] Filed: Dec. 4, 1995

[30] Foreign Application Priority Data

Dec. 9, 1994 [GB] United Kingdom ............. 9424839

[51] Int. Cl.⁶ ................. H04N 9/44; H03L 7/00
[52] U.S. Cl. ........... 348/549; 348/536; 327/159; 331/20
[58] Field of Search ............... 348/505–509, 348/514, 517, 519, 520, 536, 537, 538, 539, 546, 549, 548; 327/159, 156; 331/20, 21, 145; H04N 9/44, 9/89

[56] References Cited

U.S. PATENT DOCUMENTS

| | | | |
|---|---|---|---|
| 4,504,799 | 3/1985 | Elmis et al. ............... | 348/540 |
| 4,686,560 | 8/1987 | Balaban et al. ............ | 348/540 |
| 4,689,664 | 8/1987 | Moring et al. ............. | 348/639 |
| 5,243,412 | 9/1993 | Goukura et al. ........... | 348/505 |
| 5,515,108 | 5/1996 | Kim ........................... | 348/498 |
| 5,621,472 | 4/1997 | Kannapell et al. ........ | 348/505 |

FOREIGN PATENT DOCUMENTS 0 239 412 A2  9/1987  European Pat. Off. .
WO 94/30020  12/1994  WIPO .

Primary Examiner—Michael Lee
Attorney, Agent, or Firm—Kirschstein, et al.

[57] ABSTRACT

An arrangement for synchronizing a digitally generated color subcarrier signal to the color burst signal from another video signal, such as that from a video casette recorder or from a cable television signal, in a manner that allows a line locked clock to be used without causing unacceptable disturbance to the generated subcarrier signal.

3 Claims, 3 Drawing Sheets

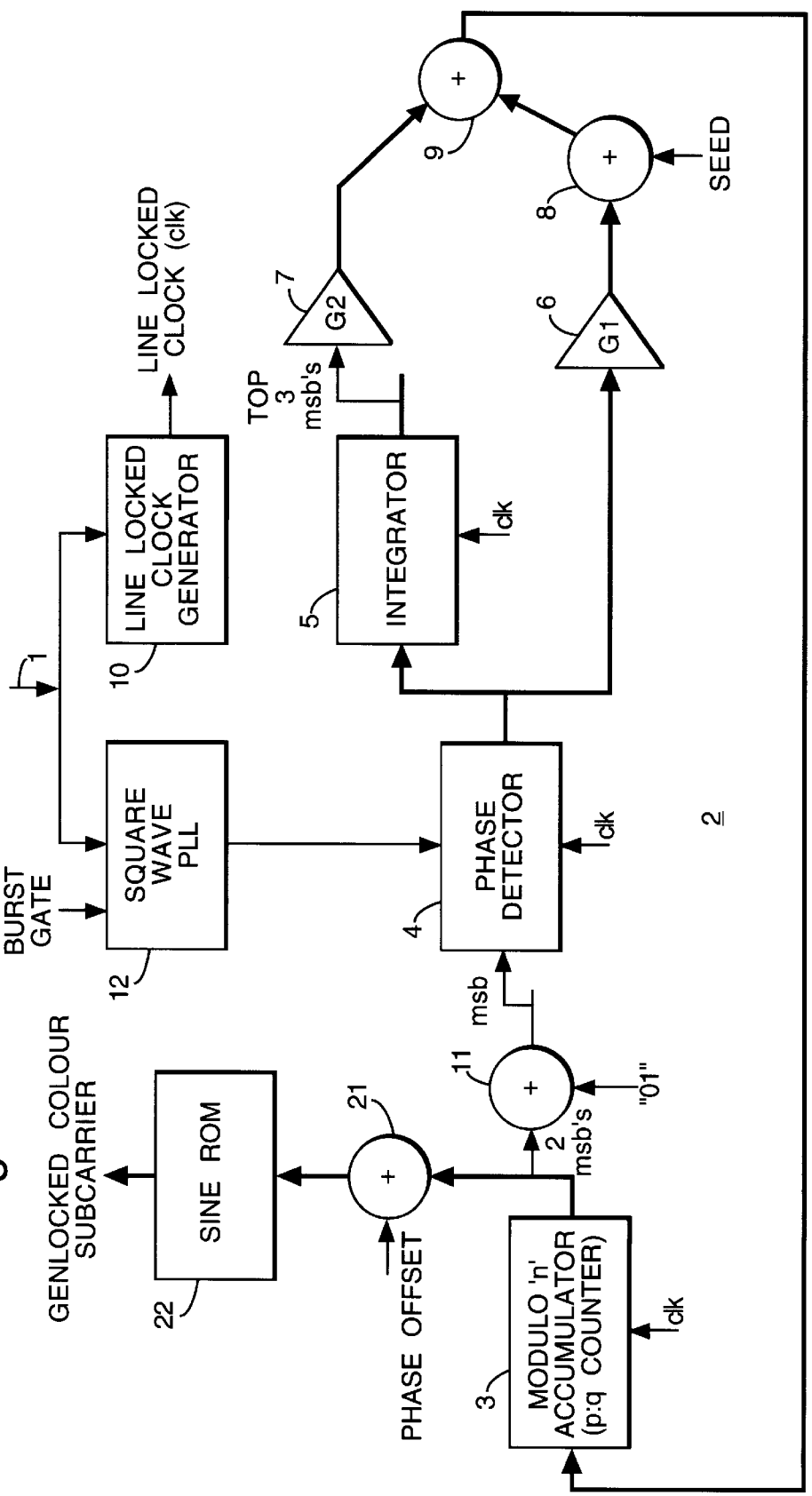

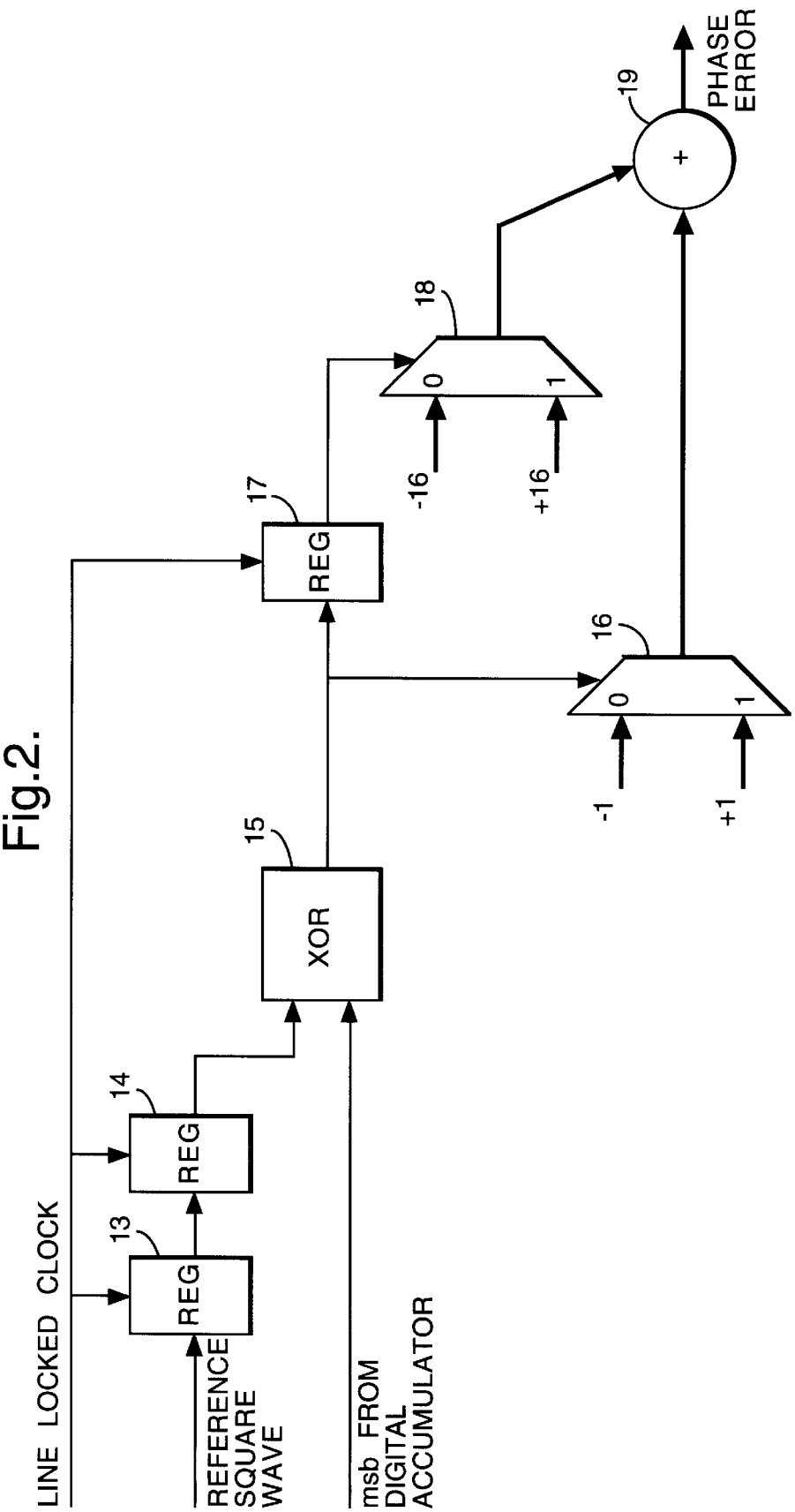

OSCILLATORY SIGNAL GENERATOR ARRANGEMENT

BACKGROUND OF THE INVENTION

The present invention relates to oscillatory signal generator arrangements, and particularly to such arrangements for generating colour subcarrier signals for use with digitally generated or computer generated video signals.

Before computer generated images can be overlayed on conventional PAL or NTSC television images derived, say, from a video cassette recorder (VCR) or from a cable or broadcast television system, it is necessary to genlock the computer generated video signals to the incoming television video signals. Genlocking in this context means the synchronisation of the respective frame and line sync, or vertical and horizontal timing pulses, and the synchronisation of the respective colour subcarriers. To simplify image processing and conversion to other scanning frequencies by the computer there is also a requirement for the use of a line locked clock.

Since the time intervals between successive line sync pulses in video signals from a VCR can vary by several percent the line frequency, and thus a line locked clock frequency derived from it, cannot be regarded as fixed and stable. On the other hand the colour subcarrier signal in the colour burst of the incoming video does remain fairly stable, any variations being comparatively small and slow. The colour subcarrier generator arrangement must therefore be arranged so that the frequency of the generated subcarrier signal is not unacceptably disturbed by variations in the line locked clock.

SUMMARY OF THE INVENTION

According to the present invention in an oscillatory signal generator for generating a colour subcarrier signal for digitally generated video signals, for use in an arrangement in which images represented by said digitally generated video signals are to be displayed substantially in synchronism with images represented by incoming television video signals, a digital phase locked loop which is arranged to be clocked by clock pulses locked in frequency to the line frequency of said incoming video signals comprises a digital accumulator, means to add an incremental digital value to the count registered by said accumulator in response to each clock pulse such that said count follows a periodic sawtooth waveform with a period, determined by the maximum count value of said accumulator and by said incremental digital value, defining the period of said colour subcarrier signal, phase comparator means to compare the phase of said periodic sawtooth waveform with the phase of a reference waveform derived from said incoming video signals, and means to determine the value of said incremental digital value in dependence upon an output signal of said phase comparator means.

Preferably said incremental digital value is the sum of a seed value, a value proportional to the instantaneous value of the output signal of said phase comparator and a value proportional to the integral of the output signal of said phase comparator. The phase comparator may comprise a two-input exclusive-OR gating means to one input of which are applied binary values dependent upon the instantaneous value of said reference waveform on the occurrence of said clock pulses and to the other input of which are applied binary values dependent upon the most-significant-bit state of said accumulator.

BRIEF DESCRIPTION OF THE DRAWINGS

An oscillatory signal generator in accordance with the present invention will now be described with reference to the accompanying drawings, of which:

FIG. 1 shows the signal generator schematically,

FIG. 2 shows part of the generator of FIG. 1 in greater detail, and

DETAILED DESCRIPTION OF THE PREFERRED EMBODIMENTS

Figure 3A:
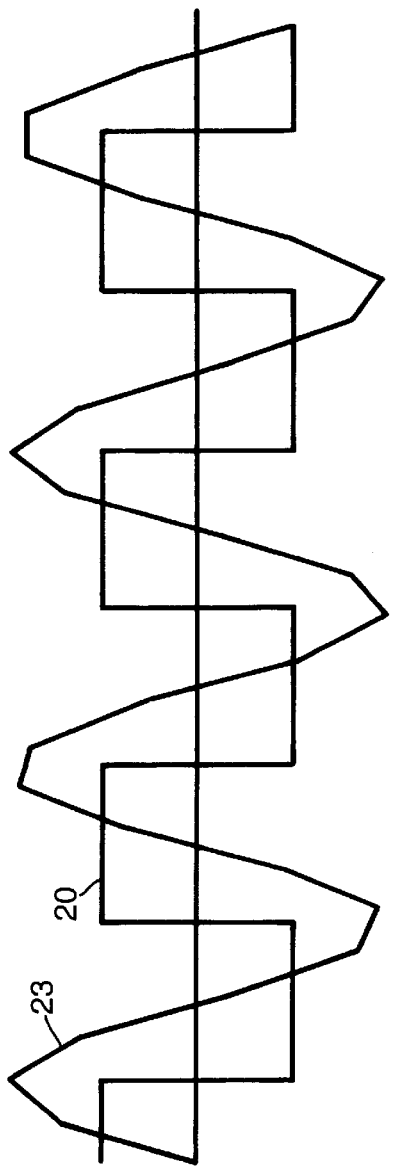
FIGS. 3(a)–3(f) show signal waveforms illustrating the operation of the signal generator of FIG. 1.

Referring first to FIG. 1, an arrangement for genlocking digitally generated video signals to incoming video signals, on an input 1, derived from a video cassette recorder (VCR) or from a cable or broadcast television system (not shown), so that the images represented by the digitally generated video signals may be displayed with or overlaid on the VCR or television images, comprises a digital phase-locked-loop signal generator 2. This signal generator 2 comprises a digital accumulator 3, a digital phase detector or comparator 4, an integrating up/down counter 5, gain units 6 and 7 and summing circuits 8 and 9.

The generator 2 operates under the control of clock pulses from a line-locked clock generator 10, at a nominal frequency of, say, 27 MHz, such that an incremental digital value, consisting of a 'seed' value entered at the summing circuit 8 plus or minus contributions by way of the gain units 6 and 7 which depend in value upon the output of the phase comparator 4, is added on the occurrence of each clock pulse to the count state registered by the accumulator 3. This count state therefore increases in a series of steps until an overflow occurs, whereupon the increase begins again from the remainder count state. A periodic output signal may then be derived from, say, the count state of the two most significant bit stages of the accumulator 3. For an output signal having a periodicity or frequency of the order of 3.5 MHz each cycle of the accumulator count state will be completed in some seven or eight steps at the clock rate of 27 MHz.

The periodic output signal from the accumulator 3, with a 90° phase offset added in a summing circuit 11, is applied as a two-state signal to one input of the phase comparator 4, to the other input of which is applied a reference square wave signal derived in a phase-locked loop circuit 12 from the colour burst of the incoming video signals on the input 1.

Referring to FIG. 2, in the phase comparator 4 the reference square wave signal is clocked through register stages 13 and 14 to one input of an exclusive -OR gate 15, the periodic output signal from the summing circuit 11 being applied to the other input of this gate. The output of the exclusive-OR gate 15 is applied to a multiplexer or selector stage 16 and to a register stage 17, the output of which in turn is applied to a selector circuit 18. Outputs from the two selector stages are combined in a summing circuit 19 to provide the output of the phase comparator 4.

Figure 3B:
Figure 3C:
Figure 3D:

As illustrated in FIG. 3 the reference square wave 20, FIG. 3(a), is effectively retimed by the line locked clock pulses, FIG. 3(b), to produce a slightly delayed waveform FIG. 3(d), the output of the summing circuit 11 being shown as FIG. 3(c). The output of the exclusive-OR gate 15 is a two-state signal which in dependence upon its value, 0 or 1, on the occurrence of a clock pulse contributes a value of −1 or +1 respectively to the summing circuit 19. The output signal of the register stage 17, in dependence upon whether its value is 0 or 1, contributes a value of −16 or +16 to the summing circuit 19. These values may for example be represented in twos-complement arithmetical form.

Figure 3E:
Figure 3F:

In the implementation illustrated by the waveforms of FIG. 3, the inverse of the retimed reference square wave, shown as FIG. 3(e), is the waveform which is compared with the waveform of FIG. 3(c), producing an output signal value from the summing circuit 19, FIG. 3(f), which varies between −17 and +17.

The output signal values from the comparator 4 are applied to the integrator 5, which may for example be a fourteen-bit integrator, supporting an integral of the phase error value of between −8192 and +8191. The value represented by the states of the three most significant bit stages of the integrator 5 is applied by way of gain unit 7, which multiplies that value by a predetermined power of two, to the summing circuit 9. At the same time the output signal values from the comparator 4 are multiplied by a power of two in the gain unit 6 and the result added to the seed value in the summing circuit 8. The total value at the output of the summing circuit 9 finally is applied, at each clock pulse, as the incremental value to step the accumulator 3.

A succession of output signal values from the accumulator 3, with any required phase offset added in a summing circuit 21, as the accumulator count is stepped through each cycle, are applied as address codes to a read-only memory (ROM) 22 which holds coded sample values for a sine wave, such that the coded samples required to define a sine wave are read out at the cyclic frequency of the accumulator count, as illustrated by the waveform 23 in FIG. 3(a). By the action of the phase-locked loop this waveform 23 will be locked in phase to the reference square wave 20 from the circuit 12, and therefore to the colour burst of the incoming video signal at input 1. By virtue of the proportional path by way of gain unit 6 and he summing circuit 8, and the integrating path by way of the integrator 5 and the gain unit 7, any short term and long term variations respectively in the frequency of the line-locked clock will be countered, such that, say, if the clock frequency increases a smaller mean value will be applied to the input of accumulator 3 and vice versa.

Suitable values for the seed and for the powers of two by which the gain units 6 and 7 multiply may be expressed algebraically in terms of the number of binary stages n of the accumulator 3, as:

$$\text{Seed } (PAL) = 2^n \times (4.43361875/27)$$

$$\text{Seed } (NTSC) = 2^n \times (3.579545/27)$$

$$G1 = 2^{(n-14)}$$

$$G2 = 2^{(n-11)}$$

Values of n may be from 12 to 26, experiments indicating that for values below 12 the quality of lock deteriorates markedly.

In order to display digitally generated video signals on their own, without genlocking, the factors G1 and G2 are set to zero and a value of n of at least 24 is used.

Experiments show that a 14-bit integrator 5 with a 26-bit accumulator 3 provides a lock range of plus or minus 50 KHz from the nominal PAL or NTSC subcarrier frequency. An overflow or underflow from the integrator 5 may be used to flag a no-lock condition.

We claim:

1. An oscillatory signal generator for generating a color subcarrier signal having a period for digitally generated video signals, for use in an arrangement in which images represented by said digitally generated video signals are to be displayed substantially in synchronism with images represented by incoming television video signals having a line frequency, said oscillatory signal generator comprising: a digital phase locked loop which is arranged to be clocked by clock signals locked in frequency to the line frequency of said incoming video signals, said phase locked loop including a digital accumulator; means for adding an incremental digital value to a count registered by said accumulator such that said count follows a periodic sawtooth waveform having a phase and a period which determines the period of said color subcarrier signal, said period of the waveform being dependent upon a maximum count of said accumulator and upon said incremental digital value; phase comparator means for comparing the phase of said periodic sawtooth waveform with a phase of a reference waveform derived from said incoming video signals; and means for deriving said incremental digital value as a sum of a seed value, a value proportional to an instantaneous value of an output signal of said phase comparator means, and a value proportional to an integral of the output signal of said phase comparator means.

2. The signal generator in accordance with claim 1, wherein said phase comparator means includes a two-input exclusive-OR gating means having a first input to which is applied binary values dependent upon an instantaneous value of said reference waveform on the occurrence of said clock signals, and a second input to which is applied binary values dependent upon a most-significant-bit state of said accumulator.

3. The signal generator in accordance with claim 1, wherein said reference waveform is phase locked to a color burst signal of said incoming video signals.

* * * * *